United States Patent [19]
Desjarlais
[11] Patent Number: 4,781,985
[45] Date of Patent: Nov. 1, 1988

[54] INK JET TRANSPARENCY WITH IMPROVED ABILITY TO MAINTAIN EDGE ACUITY

[75] Inventor: Robert C. Desjarlais, So. Hadley, Mass.

[73] Assignee: James River Graphics, Inc., South Hadley, Mass.

[21] Appl. No.: 146,087

[22] Filed: Jan. 20, 1988

Related U.S. Application Data

[63] Continuation-in-part of Ser. No. 876,448, Jun. 20, 1986, abandoned.

[51] Int. Cl.[4] ........................ B32B 27/08; B32B 27/36
[52] U.S. Cl. ................................ 428/421; 346/135.1; 428/480; 428/483
[58] Field of Search ............... 428/421, 480, 207, 195, 428/323, 483; 524/543; 346/135.1

[56] References Cited

U.S. PATENT DOCUMENTS

| | | | |
|---|---|---|---|
| 4,547,405 | 10/1985 | Bedell et al. | 428/323 X |
| 4,554,181 | 11/1985 | Cousin et al. | 428/207 |
| 4,555,437 | 11/1985 | Tanck | 428/195 X |
| 4,575,465 | 3/1986 | Viola | 428/195 X |
| 4,578,285 | 3/1986 | Viola | 428/480 X |
| 4,592,951 | 6/1986 | Viola | 428/323 |

*Primary Examiner*—Thomas J. Herbert
*Attorney, Agent, or Firm*—Burns, Doane, Swecker & Mathis

[57] ABSTRACT

An ink jet transparency is provided which exhibits a unique ability to maintain the edge acuity of ink patterns or blocks on the transparency. The ink jet transparency comprises a substantially transparent resinous support, e.g., a polyester film, and a substantially clear coating thereon which includes a specific fluorosurfactant. The presence of the fluorosurfactant of the present invention in the clear coating prevents trailing of the ink-jet ink. As a result, patterns and ink blocks do not trail into one another on the transparency, but maintain their defined shape and size.

28 Claims, No Drawings

INK JET TRANSPARENCY WITH IMPROVED ABILITY TO MAINTAIN EDGE ACUITY

CROSS REFERENCE TO RELATED APPLICATIONS

This application is a continuation-in-part of copending U.S. application Ser. No. 876,448, filed June 20, 1986, now abandoned.

BACKGROUND OF THE INVENTION

1. Field of the Invention

The present invention relates to a recording sheet for use in an ink jet recording process. More specifically, the present invention relates to an improved transparency recording sheet.

2. Description of the Prior Art

Ink jet printing refers to a method of forming type characters on a substrate, e.g., paper, by ejecting ink droplets from a printhead having one or more nozzles. Several schemes are utilized to control the deposition of the ink droplets on the printing substrate or recording sheet to form the desired characters. For example, one method comprises deflecting electrically-charged droplets by electrostatic means. Another method comprises the ejection of single droplets under the control of a piezoelectric device.

One type of ink employed is the so-called non-drying type which functions by quickly penetrating the substrate, e.g., paper fibers, thus giving the appearance of being dry to the touch even though still possessing a quantity of relatively low vapor pressure solvent. Another widely used type of ink is the aqueous ink, that is, an ink which is composed of a relatively large quantity of water which functions as the solvent and carrier for the dyes therein.

The image generated by an ink jet printing device may be either in the form of a reflective print wherein the image is deposited on a substantially opaque reflective substrate, e.g., paper, or may comprise a transparency, that is, when the image is formed on a substantially transparent recording substrate and is viewed by illuminating the side of the substrate opposite the image side and viewing from the image side. Such material is, of course, particularly advantageous for use in viewing by projection.

Since projection of a transparency generally involves enlarging of the image, the image quality requirements are more stringent for a transparency than for an image viewed by reflection. Of course a transparency must take into consideration the other problems which may be common to both the transparency and to the reflection image, for example, the water fastness problem of aqueous inks. Moreover, the use of ink jet printing for achieving high speed recording on plastic transparencies has been largely unsuccessful due to the transparent polyester film support repelling the aqueous-miscible ink solutions. As well, the ink tends to generally trail and cause blocks or patterns of ink to merge instead of remaining separate and defined. The problem of ink-jet ink trailing can be referred to as the inability of the transparency to maintain edge acuity.

Problems therefore exist in the use of transparencies with respect to the density of the images, the smear resistance of the ink, as well as with respect to maintaining edge acuity on the transparency. U.S. Pat. Nos. 4,474,850; 4,503,111; 4,528,242 and 4,547,405 disclose various ink jet transparencies. The general use of surfactants in a coating formulation has been suggested, e.g., see U.S. Pat. No. 4,547,405. However, severe problems with maintaining edge acuity still exist. It would be extremely beneficial to the industry if an ink jet transparency was available which overcame such a problem.

Accordingly, it is an object of the present invention to provide an ink jet recording transparency which exhibits excellent edge acuity for patterns and blocks of ink on the transparency.

Yet another object of the present invention is to provide an ink jet recording transparency exhibiting improved prevention of the ink from trailing.

Still another object of the present invention is to provide an ink jet recording transparency comprising a novel coating layer on a transparent substrate.

Another object of the present invention is to provide an ink jet recording transparency comprising a novel coating layer on a transparent substrate which exhibits improved ink dry times.

These and other objects of the present invention, as well as the scope, nature and utilization of the invention, will be apparent to those skilled in the art from the following description and the claims appended hereto.

SUMMARY OF THE INVENTION

In accordance with the foregoing objectives, provided herewith is an ink jet recording transparency exhibiting an improved ability to maintain the edge acuity of ink blocks on the transparency, which transparency comprises (i) a substantially transparent resinous support and (ii) a substantially clear coating thereon which includes a fluorosurfactant of the formula $$R_fCH_2CH_2SCH_2CH_2N^+(R)_3X^-$$

or $$(R_fCH_2CH_2O)_{1,2}P(O)(ONR_4)_{2,1}$$

wherein $R_f = F(CF_2CF_2)_{3-8}$ in each instance;

R is hydrogen; alkyl, preferably having from 1-6 carbon atoms; aralkyl, preferably having from 7-15 carbon atoms; alkenyl, preferably having from 1-6 carbon atoms; or alkoxy, preferably having from 1-6 carbon atoms; and X is halogen, methylsulfate ($CH_3SO_4^-$) or ethylsulfate ($CH_3CH_2SO_4^-$).

The most preferred fluorosurfactants are of the general formula $$R_fCH_2CH_2SCH_2CH_2N^+(CH_3)_3\ CH_3SO_4^{-1}$$

or $$(R_fCH_2CH_2O)_{1,2}P(O)(ONH_4)_{2,1}$$

wherein $R_f = F(CF_2CF_2)_{3-8}$ in each instance.

In another specific embodiment, a mixture of anionic and cationic fluorosurfactants are employed in order to control edge acuity.

In still another embodiment of the present invention, ink dry times are significantly improved upon utilizing an emulsion of a water insoluble polymer and a hydrophilic polymer as the coating of the transparency. The fluorosurfactants of the present invention can also be used successfully to control edge acuity in such a coating for the ink transparency.

DETAILED DESCRIPTION OF THE PREFERRED EMBODIMENTS

The ink jet recording transparency of the invention includes a transparent resin base, which is generally a thermoplastic film, such as a polyester, e.g., polyethylene terephthalate, as marketed under the trademark Mylar 40PB by DuPont, polystyrene, polyvinyl chloride, polymethylmethacrylate, cellulose acetate and the like. A polyester film base is preferred because of its excellent permanency and dimensional stability. The thickness of the resin film base is not restricted to any special range although usually it has a thickness of about 2 to 10 mils.

Polyethylene terephthalate base sheets are relatively hydrophobic, and it can be difficult to apply a water based coating to them. This problem can be overcome in a number of ways. The polyester film itself may be surface treated, e.g., by means of corona discharge, to better accept the coating. A second method is the use of an intermediate coating which has good affinity for both the base film and the surface coating. Gelatin is an example of such a material. Another method is to use a solvent system for the coating that wets the base sheet better than water alone. Alcohol can be included in an aqueous solvent system to achieve the necessary good wetting required to obtain uniform coatings. Either ethanol or methanol is satisfactory. Where a gelatin film is applied from an alcoholic solution, it is necessary to make the solution slightly acidic in order to achieve adequate solubility. A small amount of acetic acid added to the solution can accomplish this purpose.

The coating formulation useful in obtaining a clear coating over the transparent resin base can comprise any conventional resin based coating formulation used in ink-jet transparencies, with the addition of a fluorosurfactant in accordance with the present invention. For example, among the known coating formulations is a formulation comprised of a polymer component which is a carboxylated, high molecular weight polymer or copolymer, or salts thereof. Suitable polymers include carboxylated acrylic or methacrylic acid, and esters thereof; carboxylated vinyl acetates; and carboxylated styrenated acrylics. Preferably, the molecular weight of the polymer or copolymer ranges from about 50,000 to 1 million. Such polymers provide a clear coating, while being receptive to the ink so as to provide useful recorded images thereon.

The polymer may contain other substituents in addition to carboxyl groups, such as hydroxyl, ester or amino groups, as long as the wettability property of the polymer is retained, and its ionic nature is sufficient to absorb the dye component of the ink. The carboxyl group of the polymer also may be reacted wholly or partially with a base, such as a high boiling organic amine or an inorganic hydroxide, if necessary, to increase its water solubility. Typical organic amines which may be used for this purpose include methanolamine, ethanolamine and di- and trimethyl and ethanolamine. Inorganic hydroxides include sodium hydroxide, potassium hydroxide and the like.

The foregoing polymer component coating formulation may also contain a polyalkylene glycol component which is generally polyethylene glycol, although other alkylene glycols may be used as well. Preferably, such polyethylene glycols have an average molecular weight of about 5,000 to about 25,000. In a preferred embodiment, the polyethylene glycol compound is made up of two moles of polyethylene glycol of average molecular weight of 8,000 each, which are joined by an epoxide to form a glycol compound with an average molecular weight of 17,500. This glycol is available commercially, for example, as "20M" from Union Carbide Corp.

When a polyalkylene glycol component is employed, there is a suitable range of compositional amounts of polymer and glycol in the coating formulation which will provide desirable results. This range suitably includes about 5% to 70% of the glycol by weight of the polymer, preferably about 10% to 25%, and optimally, about 20% of glycol by weight of polymer. Best results are achieved when the foregoing compositional ranges are observed.

Another example of a conventional coating formulation is a formulation comprising a coalesced block copolymer latex of polyvinyl alcohol and polyvinyl (benzyl ammonium chloride), alone or with up to 95% by weight of a water-soluble polymer, e.g., polyvinyl alcohol, gelatin or polyethylene oxide.

The coating formulation may also comprise a highly hydrophilic, highly water soluble polymer such as polyvinylpyrolidone, which is available as a commercial chemical from a number of suppliers. It is preferred that the polyvinylpyrrolidone have a molecular weight of 90,000 or greater, and should not be crosslinked or be only slightly crosslinked so as to not adversely affect its room temperature solubility in water. The polyvinylpyrrolidone can also be used in combination with another matrix polymer such as either gelatin or polyvinyl alcohol.

To the base coating formulation is added the fluorosurfactant of the present invention. The fluorosurfactant is of the formula $$R_fCH_2CH_2SCH_2CH_2N^+(R)_3X^-$$

or $$(R_fCH_2CH_2O)_{1,2}P(O)(ONR_4)_{2,1}$$

wherein $R_{f=F(CF_2}CF_2)_{3\text{-}8}$ in each instance;

R is hydrogen; alkyl, preferably having from 1–6 carbon atoms; aralkyl, preferably having from 7–15 carbon atoms; alkenyl, preferably having from 1–6 carbon atoms; or alkoxy, preferably having from 1–6 carbon atoms; and X is halogen, methosulfate ($CH_3SO_4^-$) or ethosulfate ($CH_3CH_2SO_4^-$).

The most preferred fluorosurfactants are of the general formula $$R_fCH_2CH_2SCH_2CH_2N^+(CH_3)_3\ CH_3SO^-{}_4$$

or $$(R_fCH_2CH_2O)_{1,2}P(O)(ONH_4)_{2,1}$$

wherein $R_{f=F(CF_2}CF_2)_{3\text{-}8}$ in each instance. Such fluorosurfactants can be purchased commercially, e.g., as they are available from DuPont under the trademarks Zonyl FSP, Zonyl FSJ, Zonyl FSE and Zonyl FSC. Other surfactants, and in particular other fluorosurfactants, have been found to be ineffective in achieving the advantages and benefits of the present invention.

Mixtures of the foregoing fluorosurfactants can be employed when desired. Also, the foregoing fluorosurfactants can be used advantageously in combination with other fluorosurfactants. In particular, the mixture comprises at least one anionic fluorosurfactant and at least one cationic surfactant, with at least one of the fluorosurfactants being within the defined fluorosurfactants of the present invention. For example, in a specific embodiment of the present invention, an anionic surfactant of the present invention, e.g., Zonyl FSJ, is used in combination with a cationic fluorosurfactant, e.g., such as a fluorosurfactant available under the trademark Lodyne S106B. It has been found that such combinations can provide surprisingly beneficial results as to edge acuity with regard to certain commercially available inks for ink jet printing. It is important that at least one of the fluorosurfactants is of the present invention, however, otherwise the advantages are generally not realized.

The fluorosurfactant of the present invention is generally employed in an amount ranging from about 1 weight percent to about 10 weight percent based upon the weight of solid resin in the clear coating formulation. More preferably, the amount of fluorosurfactant employed ranges from about 3 weight percent to about 5 weight percent. Normal industry use of such surfactants is only from 0.001 to about 0.1 weight percent. Any conventional technique can be employed to effect the coating operation of the coating formulation containing the fluorosurfactant of the present invention.

The clear coating on the transparent support can also include such additives as ultraviolet absorbers, antioxidants, humectants, bacteriostats and/or cross-linking agents, if desired.

The thickness of the coatings used herein generally range from about 2–15 microns. Such thicknesses will accommodate dyes of varying concentrations which can be delivered to the transparency at high rates of delivery and with accompanying high dye absorbtivity into the coating.

The presence of the fluorosurfactant in the coating of the present invention results in excellent maintenance of edge acuity. Hence, ink-jet ink is prevented from trailing from one pattern or solid block of ink into another. The ability to maintain edge acuity is particularly important when different colors of ink are used. In addition to preventing ink trailing, the use of the fluorosurfactant of the present invention also results in much larger dot sizes and an improved apparent projected density. The drying time of the ink dot is also found to be improved, and a slippery surface is imparted to the transparency which helps prevent fingerprinting and film blocking. As a result, there is obtained a much sharper transparency, which is also more easily handled.

Generally, since the majority of ink-jet inks are of the aqueous type, the polymer composition of an ink jet transparency is important to obtaining large dot sizes and rapid ink drying times. The polymer composition should be water receptive and possess sufficient surface energy to spread the ink drops rapidly to obtain large dots. If the polymer composition is too water receptive, the ink droplets will not spread sufficiently and the film will feel tacky during routine handling.

Thus, in a preferred embodiment of the present invention, there is used in the coating formulation a mixture of a water soluble polymer and a water insoluble polymer. The addition of a water insoluble polymer prevents film tackiness during handling, and by reducing water receptivity slightly, allows the ink droplets to spread before ink solvent vehicle absorbtion takes place.

By carefully balancing the ratios of water soluble to water insoluble resin, plus the use of the selected fluorosurfactants of the present invention, an ink jet film is obtained which is free from tackiness or fingerprinting during handling, exhibits large dot sizes and permits the inks to dry quickly.

Examples of a suitable "water soluble" polymer include polyvinyl pyrrolidone, polyvinyl pyrrolidine/polyvinyl acetate copolymer, polyacrylamides, hydroxyethylcellulose and carboxymethylcellulose. Among the preferred water soluble polymers is polyvinyl pyrrolidine of a molecular weight of 360,000 to about 1,000,000, e.g. that are available from GAF under the trademark PVP K-90.

Examples of suitable "water insoluble" polymers are the highly styrenated acrylics available from Johnson Wax under the Joncryl trademark, the styrene/allyl alcohol co-polymers available from Monsanto Corp. under the trademarks Monsanto RJ100, RJ101 and RF4506, the nitrocellulose polymer available from Hercules, a carboxylated resin available from B.F. Goodrich under the trademark CARBOSET 525, the polyester resin and polyketone resin available from Khrumbhar Resin under the PRINCE 5130 trademark and KHRUMBAR K1717 trademark respectively, and the polyvinyl butyral resin available from Monsanto Corp. under the trademark BUTVAR B90. The Joncryl polymers are among the most preferred for the purposes of the present invention.

In a specific preferred embodiment of the present invention, an emulsion of a hydrophilic polymer and water insoluble polymer is employed in the clear resin coating. More particularly, the water insoluble polymer employed in the emulsion of this preferred embodiment is a polymer having carboxyl groups, preferably such that the polymer exhibits an acid number of around 200 or more. Furthermore, the hydrophilic polymer contains some free amine groups such that it exhibits a basic character. It is believed that the microemulsion is formed due to the acid/base interaction.

Generally, when mixing a solvent solution of such a water insoluble polymer with an aqueous solution of such a hydrophilic polymer, a coagulate forms. Upon further stirring, the coagulate breaks down to form a viscous suspension. For example, an admixture of a solvent solution of a carboxylated styrene-acrylic acid copolymer, e.g., such as available under the trademark Joncryl 678, with an aqueous solution of N-vinyl pyrrolidone/N,N-dimethyl amino ethyl methacrylate copolymer, e.g., such as available under the trademark GAF copolymer 937, forms an immediate coagulate. Upon further stirring, the coagulate breaks down to a viscous milk-like suspension.

When the viscous suspension is coated onto the resin substrate, the microemulsion results in a milky coating which surprisingly dries to a completely transparent film. The film exhibits vastly improved ink dry times, e.g., only a few minutes. The advantages of this clear coating can be realized with or without the fluorosurfactants of the present invention. However, it is most preferred to also employ the fluorosurfactants of the present invention in order to achieve a transparency coating which exhibits improved edge acuity as well.

The following examples are given as specific illustrations of the invention. It should be understood, however, that the specific details set forth in the examples are merely illustrative and in nowise limitative. All parts and percentages in the example and the remainder of the specification are by weight unless otherwise specified.

EXAMPLE I

A stock solution of the following composition was prepared:

| | Gm. |
|---|---|
| Joncryl 680 | 9 |
| Ethanol | 100 |
| Dowanol PM | 100 |
| PVP K90 | 21 |

Joncryl 680 is a styrenated acrylic of Johnson Wax Co.
Dowanol PM is a product of Dow Chemical
Polyvinyl Pyrrolidone is GAF PVP K-90

Three equal parts, 23 gm. each, were then taken from the above solution and designated solutions A, B, and C. To solutions B and C were added Zonyl FSO and Zonyl FSC respectively as follows:

| | A | B | C |
|---|---|---|---|
| Additive | none | Zonyl FSO .16 Gm. | Zonyl FSC .16 Gm. |

After mixing, the solutions were coated onto a polyester film with a wire wound rod and then dried 3 minutes at 200° F. The films were then printed on a Tektronix 4695 Ink-Jet Color Graphics Copier using the test mode of printing, and observed.

Example 1A with no surfactant showed small dots and trailing of ink between a black solid fill area and a yellow solid fill area. In addition, trailing was readily apparent between magenta and yellow and between purple and green. Because the ink dots had not spread, they took a longer time to dry. Very poor solid area fill was obtained because of the small dots.

Example 1B, containing Zonyl FSO, also exhibited trailing of inks between colors. The ink-jet dots, although larger in size did not give a uniform solid area fill.

Example 1C, containing Zonyl FSC, showed practically no ink trailing between colors in adjacent solid fill areas and gave the largest dot size. In addition, the solid fill areas exhibited a very uniform ink coverage.

Equivalent results are obtained in Sharp IO-700, Diablo Series C, and Tektronix 4696 ink-jet printers.

EXAMPLE II

Solutions of the following compositions were prepared:

| | A | B |
|---|---|---|
| Ethanol | 10 Gm. | 10 Gm. |
| Dowanol PM | 10 | 10 |
| Joncryl 678 | .9 | .9 |
| PVP K90 | 2.1 | 2.1 |
| Zonyl FSC | — | .16 |

The solutions were coated as in Example I and dried. They were then processed (printed) in a Tektronix 4695 Color Graphics Copier.

Example IIA with no surfactant had a stickier feeling, smaller dot size, longer drying time. Of more importance, there was trailing of black dots into the yellow block of color. IIB did not exhibit this effect.

EXAMPLE III

The following master solution was prepared:

| | |
|---|---|
| Joncryl 678 | 14.0 Gms. |
| Dowanol PM | 200.0 Gms. |
| Ethanol | 200.0 Gms. |
| GAF PVP K90 | 46.0 Gms. |
| TOTAL | 460.0 Gms. |

Smaller solutions of 23 gms each were then made from the master solution, and to each one was added, respectively, the commercial fluorosurfactants noted in the Table below.

TABLE

| % Solids | | Fluorosurfactant Amt. (Gms.) | Solids | Type | Comments |
|---|---|---|---|---|---|
| 50% | (1) | Zonyl FSC - .16 | .08 | Cationic | No trailing large dots |
| 40% | (2) | Zonyl FSJ - .20 | .08 | Anionic | Slight trailing |
| 50% | (3) | Zonyl FSA - .16 | .08 | Anionic | Trailing |
| 50% | (4) | 3MFC135 - .16 | .08 | Cationic | Trailing |
| Paste | (5) | 3MFC430 - .18 | .18 | Nonionic | Slight trailing, hazy film, small dots |
| 50% | (6) | 3MFC431 - .16 | .08 | Nonionic | Trailing, hazy film, small dots |
| 25% | (7) | 3MFC99 - .32 | .08 | Anionic | Trailing |
| 25% | (8) | 3MFC100 - .32 | .08 | Amphoteric | Difficulty drying film, trailing |
| 50% | (9) | 3MFC740 - .16 | .08 | Nonionic | Trailing, surfactant insoluble |
| 100% | (10) | 3MFC134 - .08 | .08 | Unknown | Trailing |
| 100% | (11) | 3MFC124 - .08 | .08 | Anionic | Trailing |
| 50% | (12) | 3MFC129 - .16 | .08 | Anionic | Trailing |
| Unknown | (13) | 3MFC170C - .16 | .08 | Nonionic | Trailing |
| 30% | (14) | Lodyne S106 - .27 | .08 | Cationic | Trailing |
| 35% | (15) | Lodyne S110 - .23 | .08 | Amphoteric | Trailing |
| 35% | (16) | Lodyne S112 - .23 | .08 | Anionic | Trailing |
| 45% | (17) | Lodyne S107 - .20 | .08 | Nonionic | Trailing |
| 100% | (18) | 3MFC433 - .08 | .08 | Unknown | Trailing |
| — | (19) | No surfactant - — | — | — | Trailing |

3M FC fluorosurfactants are a trademark of Minnesota, Mining and Manufacturing
Lodyne is a trademark of Ciba-Geigy Chemical The mixes were coated onto a ICI 505 polyester base with a wire wound Meyer rod, and dried 5 minutes at 220° F. in a Blue M convection oven. The dried coating thickness was approximately 0.25 mils (0.00025 inches). The films were then printed on a Tektronix 4695 Color Graphics Ink-Jet Copier using the Test Mode Pattern. The amount of trailing of black ink from a solid color square into an adjacent yellow solid square was observed. In addition, the amount of trailing from a Magenta solid color square to an adjacent yellow solid color square was observed. The observations are recorded in the Table above.

EXAMPLE IV

Using solutions of the same composition as Example III, the following surfactants were tested, with observations of edge acuity being recorded:

| Type | Type | Comments |
|---|---|---|
| Zonyl FSP | Anionic | No trailing, but many repellency spots |
| Zonyl FSN | Nonionic | Trailing |
| Zonyl FSO | Nonionic | Trailing |
| Lodyne S100 | Amphoteric | Trailing |
| Lodyne S103 | Anionic | Trailing |
| Non-fluorinated Surfactants | | |
| Union Carbide Ucar Super Wetter FP | | Trailing |
| Rohm & Haas Triton X405 | | Trailing |
| Union Carbide "Carbowax" 400 Polyethylene Glycol M.W. 400 | Nonionic | Trailing |
| American Cyanamide Aerosol OTS | | Trailing |

COMPARATIVE EXAMPLE I

The procedures for all of the examples of U.S. Pat. Nos. 4,474,850 and 4,528,242 were followed for making coated films. The coated films were then printd on a Tektronix 4695 color graphics ink-jet copier. Very poor ink dry times and small dots were observed. Also, a large amount of ink trailing from one solid block of color into another was observed.

Example 1 and Example 6 of U.S. Pat. No. 4,528,242 were repeated with the inclusion of 4% by wt of Zonyl FSC fluorosurfactant, in accordance with the present invention. When the films were printed on a Tektronix 4695, the ink trailing between one solid block of color to another was practically eliminated. In addition, the dot size was increased substantially, resulting in a more dense projected image.

COMPARATIVE EXAMPLE II

A coating formulation in accordance with Example 4 of U.S. Pat. No. 4,503,111 was coated onto ICI 505 base. The film was dried in a convection oven, then printed on a Tektronix 4695 color graphics copier. Severe trailing of a solid block of black ink into an adjacent solid yellow block of color was observed.

Addition of 0.25 Gm. of Zonyl FSC fluorosurfactant to Example 4 of U.S. Pat. No. 4,503,111 and repeating the print eliminated the trailing.

EXAMPLE V

Use of a combination of anionic and cationic fluorosurfactants for obtaining superior edge acuity in certain instances is demonstrated in the present Example.

A solution of the following was prepared:

-continued

| Component | Amt. (Gms) | Designed Function |
|---|---|---|
| Dowanol PM | 10 | solvent |
| Ethanol | 10 | solvent |
| Syloid 620 Silica | 0.010 | anti-blocking |
| 45% DuPont Zonyl FSJ | 0.20 | anionic fluorosurfactant |
| 30% Lodyne S106B | 0.20 | cationic fluorosurfactant |
| Joncryl 678 | 0.84 | hydrophobic polymer |
| GAF PVPK90 | 2.04 | hydrophilic polymer |
| 67% Glycolic Acid | 0.30 | improves surface energy |

The solution was coated with a #48 wire wound Meyer rod onto ICI 505 polyester film, then dried in a precision scientific convection oven for 5 minutes at 225° F. A dry coating thickness of 0.32 mils was obtained.

The film was then printed in a Xerox 4020 drop-on-demand color ink-jet printer using the NLQ (near letter quality) mode, and a computer generated color square test pattern containing black, cyan, magenta, yellow, red, blue and green colors. The printed transparency was then observed.

Excellent edge acuity was obtained between the color squares as no adjacent colors bled into each other in any combination. The inks spread well within the color blocks to give a high projected color density. The inks were dry to the touch in a very few minutes with the Xerox supplied inks.

A similar test pattern printed in a Tektronix 4695 (with Sharp inks) or a 4696 color graphics copier (with Tektronix inks) yielded equivalent results, but longer ink drying times-especially with respect to secondary colors blue, red and green where a double application of the primary colors is received by the film.

In a repeat of the same, when Zonyl FSJ was used as the sole fluorosurfactant, the inks trailed slightly in one direction. When Lodyne S106B was used as the sole surfactant, the inks trailed badly in the opposite direction. However, by using a 50/50 combination of Zonyl FSJ, an anionic surfactant of the present invention, and Lodyne S106B, a cationic surfactant, no ink trailing was observed.

In the foregoing examples:

DuPont Zonyl FSJ is an anionic surfactant of the structure:

$$(R_fCH_2CH_2O)_{1,2}P(O)(ONH_4)_{2,1}$$

DuPont Zonyl FSJ additionally contains a non-fluorinated surfactant (an aliphatic quaternary methosulfate).

Ciba-Geigy Lodyne S106B is a cationic fluorosurfactant of the fluoro alkyl ammonium chloride type.

Syloid 620 is an amorphous silica available from W.R. Grace.

Xerox supplied inks used were:

| Color | Xerox Part No. |
|---|---|
| Magenta | 8R2305 |
| Cyan | 8R2304 |
| Yellow | 8R2303 |
| Black | 8R2302 |

The Zonyl FSJ may be replaced with an amine salt of Zonyl UR $R_fCH_2CH_2O)_{1,2}P(O)(OH)_{2,1}$ DuPont Zonyl UR Suitable amines would be ethanolamine, triethanolamine, morpholine, imidazole, and the like.

EXAMPLE VI

In this example, the testing of various fluorosurfactants available from Atochem under the trademark FORAFAC was performed. These fluorosurfactants are not within the scope of the present invention.

The following master mix was prepared:

| | GMS |
|---|---|
| Dowanol PM | 100 |
| Ethanol | 100 |
| Joncryl 678 | 10 |
| Syloid 620 | 0.10 |
| PVPK 90 | 20 |
| 67% Glycolic acid | 3 |
| TOTAL | 233.1 |

The master mix was divided into 10 equal parts of 23.3 gms each. The amounts of surfactant indicated in the table below were added to each mix with the mix then being coated on the polyester film of Example V. The Xerox 4020 ink-jet printer was employed for printing onto the film.

| Type of Surfactant | Amt (gms) | Amt (solids) | Xerox 4020 Print |
|---|---|---|---|
| (1) Cationic Forafac 1179 (40%) | .20 | .08 | much bleeding |
| (2) Cationic Forafac 1098 (50%) | .16 | .08 | moderate bleeding |
| (3) Anionic Forafac 1176 (100%) | .08 | .08 | severe bleeding |
| (4) Anionic Forafac 1185 (100%) | .08 | .08 | much bleeding |
| (5) Cationic Forafac 1179 (40%) | .10 | .04 | much bleeding, |
| Anionic Forafac 1176 (100%) | .04 | .04 | especially black |
| (6) Cationic Forafac 1179 (40%) | .10 | .04 | moderate bleeding |
| Anionic Forafac 1185 (100%) | .04 | .04 | |
| (7) Cationic Forafac 1098 (50%) | .08 | .04 | moderate bleeding |
| Anionic Forafac 1176 | .04 | .04 | |
| (8) Cationic Forafac 1098 (50%) | .08 | .04 | moderate bleeding |
| Anionic Forafac 1185 | .04 | .04 | |
| (9) Cationic Lodyne S106B (30%) | .10 | .03 | no bleeding |
| Anionic Zonyl FSJ (45%) | .10 | .045 | excellent edge acuity |

Forafac 1179 is an ammonium polyfluoroalkyl salt.
Forafac 1098 is a polyfluoroalkyl pyridinium salt.
Forafac 1176 is a polyfluoro sulfonic acid salt.
Forafac 1185 is a perfluoro sulfonic acid salt.

EXAMPLE VII

A microemulsion was formed between Joncryl 678 (a carboxylated styrene acrylic polymer) and GAF copolymer 937 (a N-vinyl pyrrolidone/N,N-dimethyl amino ethyl methacrylate copolymer) as follows:

A solution of the following was prepared:

| Component | Amt. (Gms) | Function |
|---|---|---|
| Ethanol | 15.6 | solvent |
| Dowanol PM | 7.0 | solvent |
| Syloid 620 | 0.010 | anti-blocking |
| Joncryl 678 | 0.84 | hydrophobic polymer |

Into the mixing vessel was then poured:

20% GAF Copolymer 937, 10.8 gms. hydrophilic polymer. An immediate coagulation took place, but on further stirring and warming, a very fine milky emulsion was formed. Next was added:

50% DuPont Zonyl FSC, 0.24 gms. a fluorosurfactant for dot size and edge acuity.

The emulsion was coated onto ICI 505 polyester film with a #24 wire wound rod and then dried 5 minutes at 220° F. in a convection oven. Surprisingly, the dry coating of 0.32 mils. thickness had excellent clarity.

The film was then printed in a Tektronix 4696 color graphics copier using a computer generated color square test pattern containing black, cyan, magenta, yellow, red, blue and green colors. Excellent edge acuity was obtained between color squares, as no color bled into another in any combination. The inks used in this test were Textronix inks with the following part numbers.

| Color | Part No. |
|---|---|
| Black | PN-016-0839-01 |
| Cyan | PN-016-0840-01 |
| Magenta | PN-016-0841-01 |
| Yellow | PN-016-0842-01 |

The inks were dry to the touch in a few minutes, whereas if GAF copolymer 937 was substituted for by polyvinyl pyrrolidone (PVP-K90), very long dry times of the images would be encountered. This is especially so in the secondary colors green, blue and red where a double application of primary inks takes place. Ink spreading was excellent.

Similar results were obtained in a Tektronix 4695 with the following Tektronix ink part numbers:

| Color | Part No. |
|---|---|
| Black | PN-016-0839-00 |
| Cyan | PN-016-0840-00 |
| Magenta | PN-016-0841-00 |
| Yellow | PN-016-0842-00 |

The emulsion is stable for months with no settling. The emulsion also blocks a beam of light. Addition of acidic or basic materials breaks the emulsion to form solutions. The emulsion cannot be formed in water only, but only in solvents or solvents with the presence of some water (e.g., from the GAF copolymer 937).

Other Joncryl resins such as Joncryl 67, 680 and the like are useful in the formation of such an emulsion.

Other GAF polymers which are preferably used in forming the solvent emulsion are GAFQUAT 755N, 755, 734 and copolymers 845, 937 and 958. Of these, GAF copolymer 937 is most preferred.

Use of anionic fluorosurfactants available from Atochem, such as Forafac 1176 and 1185, resulted in small ink dot sizes and trailing.

Use of cationic fluorosurfactants available from Atochem, such as Forafac 1098 and 1179, resulted in large dot sizes, but the edge acuity between adjacent colors was poor (ink trailing). In addition, Forafac 1098 coatings showed many repellencies.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. An ink jet reoording transparency exhibiting an improved ability to maintain the edge acuity of ink blocks on the transparency, comprising:

(i) a substantially transparent resinous support, and (ii) a substantially clear coating thereon which includes a fluorosurfactant of the formula $R_fCH2CH_2SCH_2CH_2N^+(R)_3X^-$ or $(R_fCH_2CH_2O)_{1,2}P(O)(ONR_4)_{2,1}$ wherein $R_f=F(CF_2CF_2)_{3-8}$ in each instance;

R is hydrogen, alkyl, aralkyl, alkenyl, or alkoxy; and

X is halogen, methosulfate ($CH_3SO_4^-$) or ethosulfate ($CH_3CH_2SO_4^-$).

2. The ink jet transparency of claim 1, wherein R is alkyl, aralkyl, alkenyl or alkoxy.

3. The ink jet transparency of claim 1, wherein at least one anionic and one cationic fluorosurfactant are employed in the coating.

4. The ink jet recording transparency of claim 1, wherein the fluorosurfactant is of the formula $R_fCH_2CH_2SCH_2CH_2N^+(CH_3)_3\ CH_3SO^-{}_4$ or $(R_fCH_2CH_2O)_{1,2}P(O)(ONH_4)_{2,1}$ wherein $R_f=F(CF_2CF_2)_{3-8}$ in each instance.

5. The ink jet recording transparency of claim 4, wherein the amount of fluorosurfactant in the clear coating is in the range of from about 3 weight percent to about 5 weight percent based upon the weight of resin in the clear coating.

6. The ink jet recording transparency of claim 4, wherein the fluorosurfactant in the clear coating is of the formula $R_fCH_2CH_2SCH_2CH_2N(CH_3)_3\ CH_3SO_4^-$ wherein $R_f=F(CF_2CF_2)_{3-8}$.

7. The ink jet recording transparency of claim 4, wherein the fluorosurfactant in the clear coating is of the formula $(R_fCH_2CH_2O)_{1,2}P(O)(ONH_4)_{2,1}$ wherein $R_f=F(CF_2CF_2)_{3-8}$.

8. The ink jet recording transparency of claim 4, wherein the resinous support is a transparent polyester film.

9. The ink jet recording transparency of claim 4, wherein the amount of fluorosurfactant in the clear coating ranges from about 1 weight percent to about 10 weight percent based upon the weight of resin in the clear coating.

10. The ink jet recording transparency of claim 9, wherein the fluorosurfactant in the clear coating is of the formula $R_fCH_2CH_2SCH_2CH_2N^+(CH_3)_3\ CH_3SO_4^-$ wherein $R_f=F(CF_2CF_2)_{3-8}$.

11. The ink jet recording transparency of claim 9, wherein the fluorosurfactant in the clear coating is of the formula $(R_fCH_2CH_2O)_{1,2}P(O)(ONH_4)_{2,1}$ wherein $R_f=F(CF_2CF_2)_{3-8}$.

12. The ink jet transparency of claim 1, wherein the clear coating comprises a water soluble resin and water insoluble resin.

13. The ink jet transparency of claim 12 wherein the water soluble resin is polyvinyl pyrrolidone, polyvinyl pyrrolidone/polyvinyl acetate copolymer, polyacrylamide, hydroxyethylcellulose, carboxymethylcellulose or mixture thereof.

14. The ink jet transparency of claim 12 wherein the water insoluble resin is a styrenated acrylic, styrene/allyl alcohol copolymer, nitrocellulose polymer, carboxylated resin, polyester resin, polyketone resin, polyvinyl butyrol resin or mixture thereof.

15. The ink jet transparency or claim 12, wherein the water soluble resin comprises a basic hydrophilic polymer containing free amine groups and the water insoluble resin comprises a polymer which contains carboxyl groups, and the mixture of resins forms an emulsion.

16. The ink jet transparency of claim 15, wherein the water soluble polymer comprises N-vinyl pyrrolidone/N,N-dimethyl amino ethyl methacrylate copolymer and the water insoluble polymer is a carboxylated styrene acrylic polymer.

17. The ink jet transparency of claim 15, wherein at least one anionic and one cationic surfactant are employed in the coating.

18. The ink jet transparency of claim 12, wherein at least one anionic and one cationic surfactant are employed in the coating.

19. The ink jet transparency of claim 18, wherein the water soluble polymer is a N-vinyl pyrrolidone/N,N-dimethyl amino ethyl methacrylate copolymer and the water insoluble polymer is a carboxylated styrene acrylic polymer.

20. The ink jet transparency of claim 18, wherein the water insoluble polymer has an acid number of about 200 or more.

21. An ink jet transparency exhibiting an improved ability to maintain the edge acuity of ink blocks on the transparency, comprising:

(i) a substantially transparent polyester film support, and (ii) a substantially clear coating thereon which includes from about 1 weight percent to about 10 weight percent, based upon the weight of resin in the clear coating, of a fluorosurfactant of the formula $R_fCH_2CH_2SCH_2CH_2N^+(CH_3)_3\ CH_3SO^-{}_4$ or $(R_fCH_2CH_2O)_{1,2}P(O)(ONH_4)_{2,1}$ wherein $R_f = F(CF_2CF_2)_{3-8}$ in each instance.

22. The ink jet transparency of claim 21, wherein the fluorosurfactant in the clear coating is of the formula $R_fCH_2CH_2SCH_2CH_2N^+(CH_3)_3\ CH_3SO^-{}_4$ wherein $R_f = F(CF_2CF_2)_{3-8}$.

23. The ink jet transparency of claim 21, wherein the fluorosurfactant in the clear coating is of the formula $(R_fCH_2CH_2O)_{1,2}P(O)(ONH_4)_{2,1}$ wherein $R_f = F(CF_2CF_2)_{3-8}$.

24. The ink jet transparency of claim 21, wherein the clear coating further comprises a water soluble resin and water insoluble resin.

25. The ink jet transparency of claim 24, wherein the water soluble resin is polyvinyl pyrrolidone, polyvinyl pyrrolidone/polyvinyl acetate copolymer, polyacrylamide, hydroxyethylcellulose, carboxymethylcellulose or mixture thereof.

26. The ink jet transparency of claim 24, wherein the water insoluble resin is a styrenated acrylic, styrene/allyl alcohol copolymer, nitrocellulose polymer, carboxylated resin, polyester resin, polyketone resin, polyvinyl butyral resin or mixture thereof.

27. An ink jet recording transparency exhibiting an improved ability to maintain the edge acuity of ink blocks on the transparency, comprising:

(i) a substantially transparent resinous support, and (ii) a substantially clear coating thereon which includes a fluorosurfactant of the formula $R_fCH_2SCH_2CH_2N^+(R)_3X^-$ or $(R_fCH_2CH_2O)_{1,2}P(O)(ONR_4)_{2,1}$ wherein $R_f = F(CF_2CF_2)_{3-8}$ in each instance;

R is hydrogen, alkyl, aralkyl, alkenyl, or alkoxy; and

X is halogen, methosulfate ($CH_3SO_4^-$) or ethosulfate ($CH_3CH_2SO_4^-$), with the clear coating comprising a water soluble resin which is polyvinyl pyrrolidone, polyvinyl pyrrolidone/polyvinyl acetate copolymer, polyacrylamide, hydroxyethylcellulose, carboxymethylcellulose or a mixture thereof, and a water insoluble resin which is a styrenated acrylic, styrene/allyl alcohol copolymer, nitrocellulose polymer, carboxylated resin, polyester resin, polyketone resin, polyvinyl butyral resin or a mixture thereof.

28. An ink jet transparency exhibiting improved ink dry times, comprising:

(i) a substantially transparent resinous support, and (ii) a substantially clear resin coating comprised of an emulsion of a water soluble polymer which is a basic hydrophilic polymer containing free amine groups and a water insoluble polymer which contains carboxyl groups.

* * * * *